(12) United States Patent
Sala (10) Patent No.: US 8,626,975 B1
(45) Date of Patent: Jan. 7, 2014

(54) COMMUNICATION INTERFACE WITH REDUCED SIGNAL LINES

(75) Inventor: Leonardo Sala, Cornaredo (IT)

(73) Assignee: Maxim Integrated Products, Inc., San Jose, CA (US)

( * ) Notice: Subject to any disclaimer, the term of this patent is extended or adjusted under 35 U.S.C. 154(b) by 144 days.

(21) Appl. No.: 13/247,864

(22) Filed: Sep. 28, 2011

(51) Int. Cl.
*G06F 13/40* (2006.01)
*G06F 13/36* (2006.01)
*H04L 12/28* (2006.01)

(52) U.S. Cl.
USPC .......................... 710/307; 710/315; 370/401

(58) Field of Classification Search
USPC .................................. 710/307, 315; 370/401
See application file for complete search history.

(56) References Cited

U.S. PATENT DOCUMENTS

| | | | | |
|---|---|---|---|---|
| 6,098,130 A * | 8/2000 | Wang | | 710/100 |
| 7,098,685 B1 * | 8/2006 | Agrawal et al. | | 326/38 |
| 7,881,332 B2 * | 2/2011 | Basso et al. | | 370/465 |
| 8,051,349 B2 * | 11/2011 | Whetsel | | 714/729 |
| 8,358,553 B2 * | 1/2013 | Schultz et al. | | 365/219 |
| 2003/0196022 A1 * | 10/2003 | Cruz | | 710/315 |
| 2010/0095034 A1 * | 4/2010 | Zhang et al. | | 710/105 |
| 2012/0082166 A1 * | 4/2012 | Sala et al. | | 370/401 |
| 2012/0317452 A1 * | 12/2012 | Whetsel | | 714/727 |

* cited by examiner

*Primary Examiner* — Paul R Myers
*Assistant Examiner* — Christopher A Daley
(74) *Attorney, Agent, or Firm* — TIPS Group (57) ABSTRACT

Communication interfaces having reduced signal lines. In one aspect, a physical layer circuit, set forth by way of example and not limitation, interfaces a link controller and a device communication bus, and includes a wrapper coupled to a first interface bus having only six or less communication lines and coupled to a second interface bus having a larger number of communication lines than the first interface bus. The wrapper can communicate first signals with the link controller over the first interface bus and perform conversion between the first signals and second signals communicated on the second interface bus. A core, coupled to the wrapper by the second interface bus, can communicate device signals with the device communication bus by performing conversion between the second signals and the device signals.

18 Claims, 7 Drawing Sheets

COMMUNICATION INTERFACE WITH REDUCED SIGNAL LINES

BACKGROUND

Digital communication interfaces have become widespread with modern technology's emphasis on rapid transfer and communication of digital data for an ever-increasing amount of important functions, including data storage, output transmission, and device control. These interfaces are used in a number of applications for electronic devices, and include standard communication specifications such as Universal Serial Bus (USB), Serial Advanced Technology Attachment (SATA), Firewire, etc. USB, for example, is a commonly-used device interface standard that allows data communication between a host and one or more peripheral devices. A link controller (or "link") is typically used to interface data and signals to and from processors of a system for use with the USB bus. For example, the USB link controller is often embedded in a system on a chip (SoC).

There is increasing demand for smaller products having less cost and power consumption. As smaller deep sub-micron processes are introduced and become widely used, integrating physical layer analog circuitry required by technologies such as USB becomes more challenging. To reduce time-to-market and cost, the link controller SoC can include most of the USB digital logic and a physical layer transceiver (PHY) can be provided in a separate (external) integrated circuit chip which interfaces the link controller with the USB bus.

One standard communication interface used between the USB link controller and the external PHY chip is known as ULPI (UTMI+ Low Pin Interface). This interface is a standard for high-speed USB systems such as USB 2.0 and is an extension of the UTMI+ interface standard (USB Transceiver Macrocell Interface) for managing USB communications. This interface provides data communication of USB packets as well as control signals and a clock signal.

For example, the link controller on the SoC can include a UTMI+ link core and a link wrapper for adapting a large set of UTMI+ signals from the link core to a smaller set of signals used by the ULPI interface and transmitted to the PHY. The PHY chip performs a similar function, having a ULPI wrapper that receives the smaller set of signals from the SoC's link wrapper and adapts and serializes that smaller set of signals to the larger set of UTMI+ signals which can be sent to and processed by a UTMI+ PHY core within the PHY. The PHY core adapts these signals and sends out appropriate signals on the connected USB bus.

The ULPI standard is popular because it allows the number of lines between SoC and PHY to be reduced to 8 or 12 signals by using three control signal lines, a clock line, and eight bi-directional data lines in the widely-used single data rate (SDR) implementation (four bi-directional data lines are specified for double data rate (DDR) implementations). Reducing the number of lines as in the ULPI interface allows a smaller pin count on the PHY and SoC compared to using UTMI, which is advantageous for smaller-scale and higher-frequency integrated circuits since it lowers the cost of integrated circuits and allows a smaller printed circuit board (PCB).

However, despite the reduced pin count allowed by the ULPI interface, the number of pins provided by the ULPI standard can still pose a burden on the use of USB interfaces in today's smaller devices, especially if multiple USB connections are managed simultaneously. Pin count reductions reduce the cost and footprint of the PHY chip on a printed circuit board and reduce the number of pins dedicated to USB for the link controller. Therefore designers and manufacturers of more recent USB devices are interested in ways to reduce this pin count even further.

Some attempts have been made to further reduce the number of pins in the ULPI interface. However, these approaches all have had significant limitations. For example, some approaches require a specialized analog front-end (AFE) rather than the more common CMOS I/O circuits, thus requiring more cost to manufacture. In some approaches, changes are required to the USB software stack, creating further complications in adapting these approaches to the existing standard. In other approaches, a new system PHY is provided (e.g., integrated on chip or package), but this PHY departs significantly from existing hardware and this increases the cost of the system significantly. Interface specifications such as High Speed Inter-Chip (HSIC) and Superspeed Inter-Chip (SSIC) require connections to an entire USB hub core. Thus, these solutions require extensive changes to the standard designs. Furthermore, the long term feasibility of one or more of these approaches may be in question due to rapidly advancing technology threatening to make obsolete such specialized and expensive solutions.

These and other limitations of the prior art will become apparent to those of skill in the art upon a reading of the following descriptions and a study of the several figures of the drawing.

SUMMARY

A physical layer circuit for interfacing a link controller and a device communication bus, set forth by way of example and not limitation, includes a wrapper coupled to a first interface bus having only six or less communication lines and coupled to a second interface bus having a larger number of communication lines than the first interface bus. The wrapper is operative to communicate first signals with the link controller over the first interface bus and to perform conversion between the first signals and second signals communicated on the second interface bus. A core is coupled to the wrapper by the second interface bus, the core operative to communicate device signals with the device communication bus coupled to the core by performing conversion between the second signals and the device signals.

A link controller for interfacing with a physical layer circuit connected to a device communication bus, set forth by way of example and not limitation, includes a wrapper coupled to a first interface bus having only six or less communication lines and coupled to a second interface bus having a larger number of communication lines than the first interface bus. The wrapper is operative to communicate first signals with the physical layer circuit over the first interface bus and to perform conversion between the first signals and second signals communicated on the second interface bus. A core coupled to the wrapper by the second interface bus, the core operative to communicate with at least one controller of a device incorporating the link controller and the physical layer circuit, the core performing conversion between the second signals and signals operable by the at least one controller A method for interfacing a link controller and a device communication bus, set forth by way of example and not limitation, includes converting signals between a first interface protocol and a second interface protocol, the second interface protocol having a larger number of signals than the first interface protocol. The signals are communicated using the first interface protocol on an interface bus having only six or less communication lines between the device communication bus and the link controller.

A system providing an interface between at least one device controller and a device communication bus, set forth by way of example and not limitation, includes a link controller provided on a first chip, the link controller coupled to a first interface bus having only six or less communication lines and coupled to the at least one device controller. The link controller is operative to communicate first signals with the physical layer chip over the first interface bus and to perform conversion between the first signals and signals communicated to the at least one device controller. A physical layer chip is provided externally to the first chip and coupled to the first interface bus and the device communication bus. The physical layer chip is operative to communicate first signals with the link controller over the first interface bus and to perform conversion between the first signals and device signals communicated on the device communication bus.

These and other combinations and advantages and other features disclosed herein will become apparent to those of skill in the art upon a reading of the following descriptions and a study of the several figures of the drawing.

BRIEF DESCRIPTION OF THE DRAWINGS

Several examples will now be described with reference to the drawings, wherein like components are provided with like reference numerals. The examples are intended for the purpose of illustration and not limitation. The drawings include the following figures.

DETAILED DESCRIPTION OF EXAMPLE EMBODIMENTS

In the following descriptions, interface components will be discussed with reference to the specific examples such as the USB device interface standard. These examples are not to be seen as limiting but, rather, illustrative of the general concepts set forth herein.

Herein, the term "communicate with" is intended to include communication in one (either) direction or bi-directionally. The term "converting between" or "conversion between" is intended to include converting a signal in either direction or bi-directionally. The term "data" is intended to refer to any information suitable for communication between devices.

Figure 1:
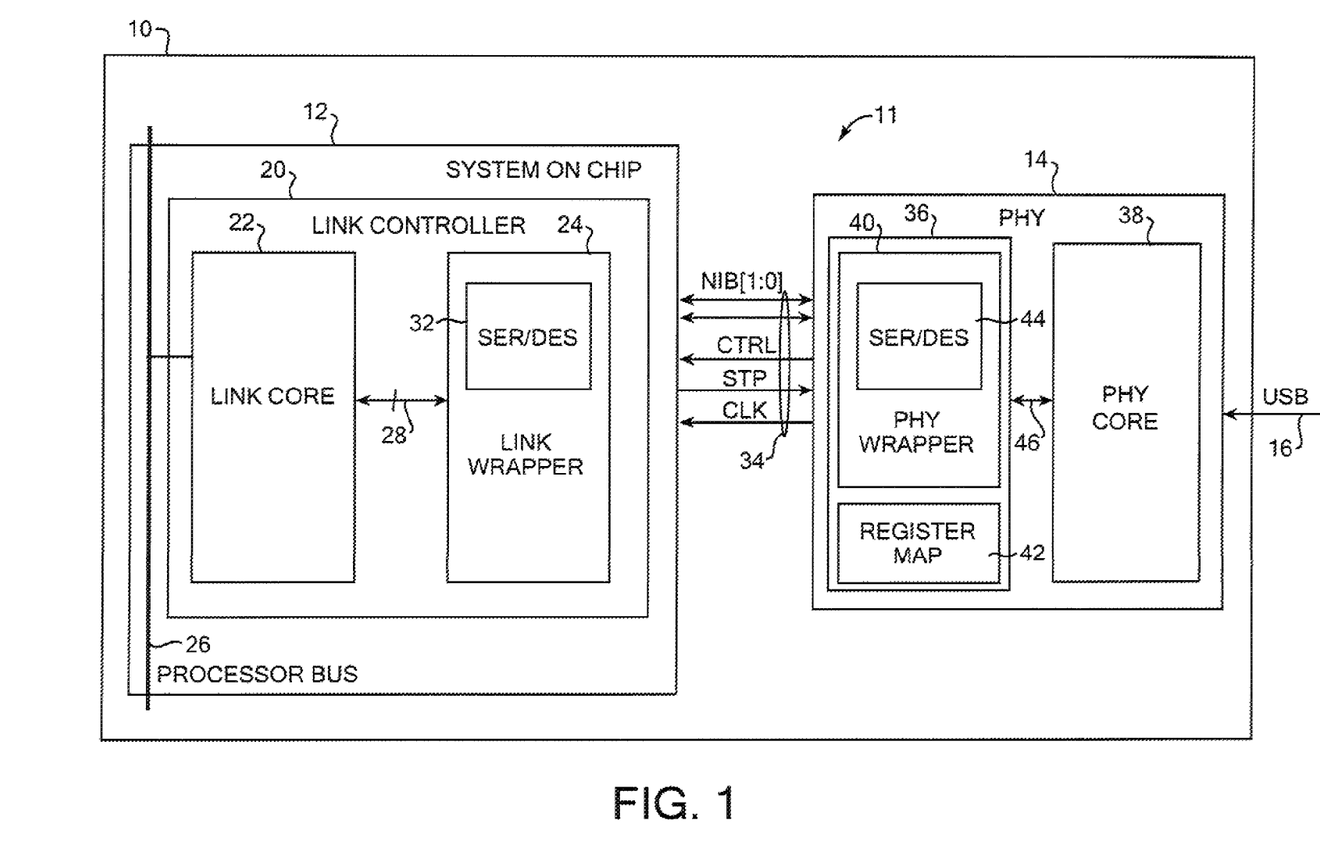
FIG. 1 is a block diagram of an example system suitable for use with one or more features or embodiments described herein.

FIG. 1 is a block diagram of an example system 10 suitable for use with one or more features or embodiments described herein. System 10 is coupled to a device communication interface and can communicate data over the communication interface to other electronic devices. System 10 can be provided in a computer or other type of electronic device 11, which can be a computer, laptop, server, portable device, cell phone, tablet, personal digital assistant (PDA), e-book reader, peripheral device, storage device, or other device.

System 10 includes components such as a system on a chip (SoC) 12 which communicates with a physical layer (PHY) transceiver chip 14. The PHY 14 communicates in turn with a standard device communication bus 16. In some examples described herein, the Universal Serial Bus (USB) standard is referred to as an implementation of device communication bus 16. Any of the applicable USB versions or standards can be used with features described herein, including USB 2.0 and USB 3.0. Other embodiments can use other communication standards for bus 16, such as Serial Advanced Technology Attachment (SATA), Firewire, etc.

The SoC 12 controls the interface of the electronic device with the device communication bus 16. The SoC 12 is provided on an integrated circuit chip, and can be implemented in any of various forms, such as an application-specific integrated circuit (ASIC), field programmable gate array (FPGA), serial interface engine (SIE), or other processors of circuits. Various components can be included in the SoC 12 relating to communication over interface bus 16 as well as (optionally) other device functions.

A link controller 20 is provided on the SoC 12 to control functions related to the device communication bus 16, including interfacing between the communication bus 16 and one or more device controllers of the electronic device 11 (such as processors, processing circuits, or other controllers). The link controller can act as a bridge between software running on the device controllers and the PHY 14, and can use interface signals and protocol for operations of the system 10. For example, the link controller 20 can control the mode and protocol settings of the PHY 14, report timeout events to software on the electronic device 11, buffer data during receive and transmit operations, format data into transactions, etc.

The link controller can include a link core 22 and a link wrapper 24. The link core 22 is coupled to one or more device controllers (such as one or more processors) of the electronic device 11 via a processor bus 26 or other communication channel. When the electronic device 11 outputs signals onto the communication bus 16, the link core 22 can receive data from one or more device controllers (e.g., from software running on processors) and adapt that data into a form suitable for communication over bus 16. In an example embodiment, the link core 22 can adapt received data from the electronic device 11 into a core interface protocol suitable for transmission from a link to a transceiver such as PHY 14. For example, core interface protocol can be UTMI or UTMI+. These standards provide signals enabling communication between a link controller and a PHY, including data lines and control lines. The control lines, for example, enable the link core to control settings of the PHY and receive statuses from the PHY relating to bus 16 communication, enable speed modes, etc. The UTMI+ standard, for example, typically includes at least 35 separate lines, such as 56 lines in some embodiments, including data and control signals. In other embodiments, different interface standards can be used for the core interface protocol.

The link core 22 provides the signals of the core interface protocol to the link wrapper 24 over a core protocol bus 28. In some embodiments, the link wrapper 24 adapts the signals of the core interface protocol into an intermediate interface protocol having fewer lines than the core interface protocol. The intermediate protocol combines the functionality of the core protocol into a reduced number of lines and therefore requires less I/O pins at its interface between chips. In one example, the intermediate interface protocol can be UTMI+ Low Pin Interface (ULPI), which provides an interface bus having 12 lines in standard implementations: eight bi-directional data lines and four uni-directional control signals (an 8-line option is also defined and rarely used, providing four bi-directional data lines). The ULPI protocol specifies that the eight data lines are bi-directional between the SoC 12 and PHY 14, NXT and DIR control signals are provided from the PHY 14 to the SoC 12, an STP control signal is provided from the SoC 12 to the PHY 14, and a clock signal CLK can be provided from the PHY 14 to the SoC 12 (or alternatively can be provided from the SoC to the PHY). For example, the NXT signal can be used for signaling readiness for a next datum on the data bus, the DIR signal for signaling direction of signals of the data bus, and the STP signal for stopping data communication. The ULPI standard provides lines that include the information from all the data and control signals of the core interface protocol and preserves the core protocol requirements such as clock frequency, duty cycle, etc., while providing its own requirements, modes, and options. In other embodiments, no intermediate protocol is used, and the core protocol signals are provided directly to the serdes 32.

In the embodiments described herein, the link wrapper 24 additionally includes a serializer/deserializer ("serdes") 32 for providing features described herein. Serdes 32 receives the signals of the intermediate protocol bus from other components in the link wrapper 24 and further reduces the number of lines, thus adapting the signals into a reduced-line interface protocol that is used to transmit the signals to the PHY 14 on bus 34. This enables greater reduction of the number of pins connecting the SoC to the PHY 14 and therefore reduces cost and space required on the integrated circuit chips of the SoC 12 and the PHY 14, freeing up space on these chips.

An advantage to the serdes 32 is that it interfaces with and is compatible with the existing intermediate interface protocol, such as ULPI. This allows the reduced-line interface implementation to be easily incorporated into existing designs that utilize the intermediate interface standard. Thus, no new software is needed for the link controller 20 nor for the device controllers of the electronic device 11. Furthermore, the serdes 32 adds only a small amount of hardware to a standard link wrapper. For example, some implementations need add only as little as 10,000 gates for the serdes 32 functionality.

The serdes 32 reduces the number of lines by encoding the information of the intermediate protocol bus into the reduced-line protocol having a bus with the reduced number of lines. In some example embodiments described herein, the serdes 32 can adapt the intermediate protocol signals to the reduced-line protocol having six or less total lines. Some examples include the embodiments using five lines as described below with respect to FIG. 4, and embodiments using four lines as described below with respect to FIGS. 5A-5D. However, other embodiments of the reduced-line protocol can allow an even further reduced number of lines, such as three lines, two lines, or one line. Such embodiments can serialize a greater number of the intermediate protocol signals onto a reduced number of lines in a similar way to the 4- or 5-line embodiments described herein, and, in some embodiments, can use higher frequencies/data rates to serialize additional signals. An example serdes 32 that adapts the second interface signals to five lines is described in greater detail below with respect to FIG. 2. In addition, some embodiments of the serdes 32 can include an optional encoder/decoder (codec) that can encode auxiliary data onto the reduced-line protocol signals, as described with reference to the examples of FIGS. 2 and 3.

Link serdes 32 outputs appropriate signals of the reduced-line protocol over interface bus 34 to the PHY 14. In some embodiments, bus 34 uses physical pins of the SoC 12 to connect to corresponding physical pins of the PHY 14 provided on a separate integrated circuit chip implementing the PHY 14. In the example of FIG. 1 showing ULPI signals, five total lines are used in bus 34, including two data lines DAT and three control lines CTRL, STP, and CLK. The serdes 32 can send data signals over the two data lines DAT as well as the STP control signal, and can send the CLK signal in alternate embodiments. The link serdes 32 can receive the DAT signals as well as the NXT and DIR control signals. Additional auxiliary data can also be included in the control signals such as the STP signal, as described in greater detail with respect to FIGS. 2-4.

PHY 14 is a circuit that acts as an interfacing component between the SoC 12 and the device communication bus 16. In the described examples, the PHY 14 is provided on an integrated circuit chip external to and separate from the SoC 12 and can include an analog transceiver and digital processing logic. The PHY 14 can transmit and receive data on the bus 16 conforming with the bus 16 requirements of frequency, jitter and duty cycle, and can provide several functions for the link controller 20 to use. In one example of a USB communication interface bus 16, the PHY 14 can act as the USB transceiver and transmit and receive data at various speeds allowed by the USB interface, such as High Speed (480 Mbit/sec), Full Speed (12 Mbit/sec), and Low Speed (1.5 Mbit/sec). The PHY 14 can serialize parallel data from the link controller 20 for transmission on the USB cable, and deserialize data from the USB cable into parallel data for the link controller 20. The PHY 14 can also provide flow control for both transmit and receive data, perform particular encoding and decoding for transmitting and receiving data, provide packet timing functions, and provide control signals for settings such as selection of speed, operational mode, bus resistors, and power settings. In some embodiments, the PHY can be completely under control of the link controller 20.

PHY 14 can include a wrapper block 36 and a PHY core 38. The wrapper block 36 includes a PHY wrapper 40 and a register map 42. The PHY wrapper 40 is coupled to the interface bus 34 providing communication using the reduced-line protocol signals from the link controller. The PHY wrapper 40 performs an analogous function for the PHY as the link wrapper 24 performs for the link controller 20, adapting signals of the intermediate interface protocol (such as ULPI) to and from the reduced-line interface protocol. For example, when the device 11 sending data onto the communication bus 16, PHY wrapper 24 receives signals over bus 34. A serdes 44 is included in the PHY wrapper and adapts the reduced-line protocol signals to the intermediate interface protocol having a bus with a higher number of signal lines. In the example shown in FIG. 1, the serdes 44 receives three signals over bus 34, including two data lines DAT and one control line STP. The serdes 44 can send data on bus 34 on the two data lines DAT and the control lines NXT and DIR. One example of a serdes 44 suitable for use in the PHY wrapper 40 is described below with respect to FIG. 3.

An advantage of the serdes 44 is that it is interfaces with and is compatible with the existing intermediate interface protocol standard, such as ULPI. This allows the reduced-line interface implementation to be easily incorporated into existing designs that utilize the intermediate protocol bus. Thus, no new software or firmware is needed for the PHY 14.

Furthermore, the serdes 44 adds only a small amount of hardware to a standard PHY used without the reduced-line protocol.

Other components in the PHY wrapper 44 send and receive the standard set of intermediate protocol signals on an intermediate bus to and from the serdes. These components perform standard functions of the PHY wrapper, including converting intermediate protocol signals into a larger number of core protocol signals. The PHY wrapper 40 outputs the core interface protocol signals on a core protocol bus 46 to the PHY core 38. For example, in some embodiments the intermediate interface protocol is ULPI (typically having 12 lines on the intermediate bus) and the core interface protocol is UTMI or UTMI+ (typically having 35 to 56 lines on the core bus 46).

In some embodiments, a register map 42 can also be included in the wrapper block 40. Register map 42 includes a set of registers defined for the PHY 14 which can be used in one or more of the interface protocols to store various settings and status information. For example, the registers can store signals for the core interface protocol which are useful during use of the intermediate interface protocol when not transmitting or receiving data to and from the communication bus 16. In some embodiments, register map 42 can also be used for the reduced-line interface protocol if needed.

The PHY core 38 receives the core protocol signals from the core bus 46 and coverts these signals to a form needed to send the signals over the device communication bus 16. For example, in some embodiments, the PHY core 38 can receive UTMI or UTMI+ signals from the PHY wrapper 40 and convert the signals to a form suitable for USB bus 16. This can include, for example, serializing parallel data in the core interface protocol for use on a serial communication bus 16.

Similarly, when the electronic device 10 receives signals on the communication bus 16, signals are communicated in the opposite direction of communication described above, namely from the communication bus 16, to the PHY 14, and to the SoC 12. In this direction, the PHY 14 core converts the communication bus signals to the core interface protocol, and then outputs these core protocol signals to the PHY wrapper over bus 46. The PHY wrapper converts the core protocol signals to a lesser number of intermediate protocol signals, and then provides these signals on an intermediate bus to the PHY serdes 44. The serdes 44 converts the intermediate protocol signal lines to a lesser number of reduced-line protocol signal lines, and outputs the reduced-line protocol signals over bus 34 to the SoC 12. The link serdes 32 in the link wrapper 24 receives the reduced-line protocol signals, converts the signals to the larger number of intermediate protocol signal lines, and provides the intermediate protocol signals on an intermediate bus to other components in the link wrapper 24. These other components convert the intermediate protocol signals to a larger number of core protocol signals, and communicate the signals to the link core 22 over bus 28. Link core 22 converts the core protocol signals to signals suitable for communication with other components in the electronic device 11, such as one or more device controllers.

Figure 2:
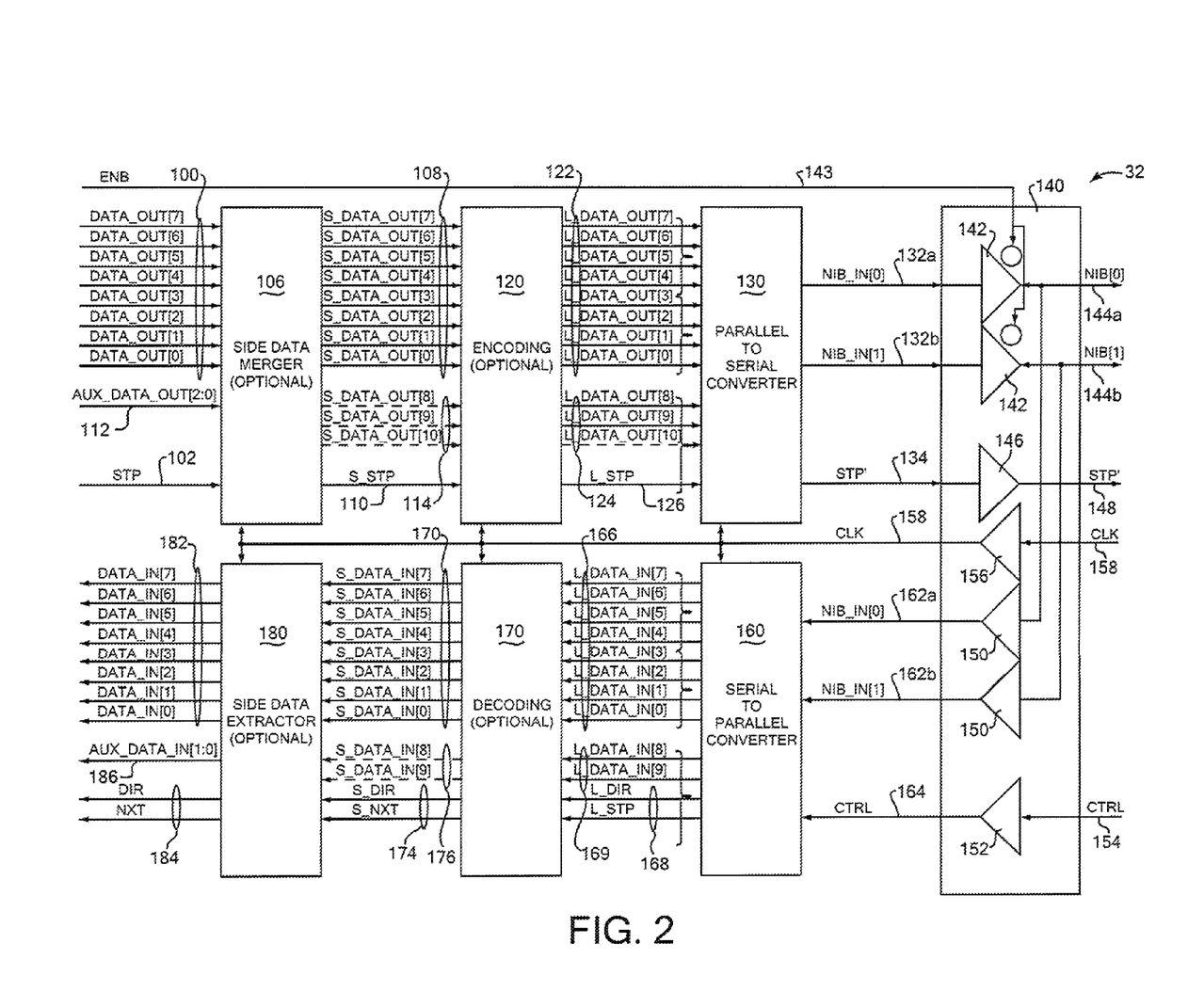
FIG. 2 is a schematic diagram illustrating one example of a serdes for use in the link wrapper of the SoC in FIG. 1.

FIG. 2 is a schematic diagram illustrating an example of a serdes 32 for use in the link wrapper 24 of the SoC 12 shown in FIG. 1. Serdes 32 can be implemented within the link wrapper 24 and can be connected to the other standard components of the link wrapper. For sending signals in a direction from the electronic device 11 to the PHY 14, serdes 32 includes auxiliary data merger block 106, encoding block 120, and parallel to serial converter block 130.

When receiving signals from the link core 22 for output by the electronic device 11, the serdes 32 receives intermediate protocol signals. In some embodiments, such as the example of FIG. 2, the signals are provided according to the ULPI standard. These intermediate protocol signals include data signals 100 and STP control signal 102. An auxiliary data merger block 106 can optionally be included in serdes 32 in some embodiments, which receives these signals and an auxiliary data signal 106. The auxiliary data merger block 106 passes through the data signals 100 and outputs them as data signals 108, and passes through the STP signal 102 and outputs it as STP signal 110. The merger block 106 also processes the auxiliary data signal 112 by merging the auxiliary data line into the intermediate protocol. Specifically, the merger block 106 takes serial data received on the auxiliary data signal 112 and splits it into three output auxiliary lines 114 (e.g., signals CB1, CB2, and CB3 in the example of FIG. 4) suitable for serializing into the reduced-line protocol at a later stage. The auxiliary data on auxiliary data signal 112 can be extra data in excess of the data carried by the intermediate protocol and used for various purposes, such as bits used in encoding by the encoding block 120, and/or extra data (headers, control signals, etc.) which the electronic device 11 may desire to send to the PHY 14 or send to another device or host on the communication bus 16 in addition to the data provided on data lines 100 and control signals. For example, an application processor on the device 11 can send additional inputs to the PHY 14, and/or extra status information regarding the PHY 14 can be conveyed via the auxiliary signals.

An encoding block 120 optionally can be included to receive the data signals 108, STP signal 110, and auxiliary signals 114. The encoding block 120 can perform an encoding process to encode the received information into another form suitable for particular uses. Extra data needed for the encoding can be provided on one or more of the auxiliary data signals 114. For example, in some embodiments the encoding block 120 can perform low power encoding on the data of data signals 108, which provides the data in a form allowing less power consumption. One example of low power encoding is encoding providing less signal transitions, such as transition-minimized differential signaling, which converts an input of 8 bits into a 10-bit code. In one example, the encoding block 120 can use the 8 bits from the data signals 108 and two encoding bits from the auxiliary data signals 114 to encode a 10-bit code providing reduced power consumption for the interface. Eight bits of the 10-bit code can be output from encoding block 120 as data signals 122, and the two other bits can be output as auxiliary signals 124. Other types of encoding can be used in other embodiments. The STP signal 110 is passed through and output as STP signal 126, and any auxiliary signals not used in the encoding can be passed through encoding block 120 and output in auxiliary signals 124. In other embodiments, no encoding is performed by the encoding block 120 and/or the encoding block 120 is not included in the serdes 32.

In some embodiments, the auxiliary lines 112, 114, and 124 are used only for providing encoding bits used to encode the data by the encoding block 120. Other embodiments can use the auxiliary lines 112, 114, and 124 only to provide auxiliary data unrelated to encoding. In still other embodiments, a hybrid approach can use one or more of the auxiliary signals for encoding and other auxiliary signal(s) for extra (non-encoding) data.

A parallel to serial converter block 130 receives the data signals 122, the auxiliary signals 124, and the STP signal 126. Converter block 130 converts these signals into a reduced number of signals and lines in the reduced-line protocol (three out of five interface signals used in this example) and outputs these signals on lines of the interface bus 34. In the example of FIG. 2, eight data signals 122 are received which are converted to two NIB_OUT signals 132, each of the output signals 132 providing the equivalent data of four of the data signals 122. For example, output signal 132a can provide the data from signals L_DATA_OUT[4]-[8] and output signal 132b can provide the data from signals L_DATA_OUT[0]-[3]. The STP signal 126 is provided in the STP' output signal 134. In addition, the converter block 130 can in some embodiments combine the STP signal 126 with any auxiliary signals on the three auxiliary lines 124, providing a combination of signals on the output STP' signal 134.

The three signals 132a, 132b, and 134 output by the parallel to serial converter 130 are received by an I/O block 140, which can be included in serdes 32 or be external to the serdes. I/O block 140 includes data output buffers 142 for receiving and buffering the data signals 132a and 132b and outputting them as signals 144a and 144b on the interface bus 34. Buffers 142 can be enabled or disabled by an ENB signal 143 provided by device controller(s) of the electronic device 11, such as one or more processors. I/O block 140 also includes an output buffer 146 for receiving and buffering the STP' signal 134 and outputting it as signal 148 on the interface bus 34.

On the receiving side of serdes 32, a similar set of functional blocks is provided to interface signals received from the PHY 14 and provided to other components of the electronic device 11. The receiving side includes a serial to parallel converter block 160, a decoding block 170, and an auxiliary data extractor block 180.

The I/O block 140 includes a number of input buffers receiving the incoming signals from the PHY 14 over the interface bus 34. These buffers include input data buffers 150 which receive the data signals 144a and 144b on the bus 34 and output equivalent signals 162a and 162b. An input buffer 152 receives and buffers an incoming CTRL signal 154 and outputs it as signal 164. An input clock buffer 156 receives a CLK signal 192 from the PHY 14 over the interface bus 34. The clock buffer 190 receives the CLK signal 158 from the PHY 14 and provides the clock signal to the components of the serdes 32, including the blocks 106, 120, and 130 on one side, and the blocks 160, 170, and 180 on the other side.

The serial to parallel converter block 160 receives some of the signals of the reduced-line protocol from the I/O block 140, which in this example include the NIB_IN[0] and [1] signals 162a and 162b, respectively. The serial to parallel converter block 160 converts these signals into the eight data signals of the intermediate protocol which the two signals 162a and 162b are carrying, and outputs these as signals 166. The converter block 160 also receives a CTRL signal 164 from the I/O block 140, which can carry control signals of the intermediary protocol, such as two control signals in this example. The converter block 160 converts the CTRL signal 164 into the DIR and NXT signals used by the intermediary protocol and outputs these as signals 166. In addition, if auxiliary data is included in the received signals for encoding or extra data, then the converter block 160 converts these signals (e.g., CF1 and/or CF2 in FIG. 4) in the CTRL signal 164 to the output auxiliary signals 169.

The decoding block 170 receives the data signals 166, the control signals (e.g., DIR and NXT) 168, and the auxiliary data signals 169 from the serial to parallel converter 160. If encoding and decoding is being used, the decoding block 170 decodes the encoded data on the signals 166 and 169. For example, low power encoding may have been provided on the data by the PHY 14 from which this data was received. The decoded data is output by the decoding block 170 as data signals 172, and any (non-encoding) auxiliary extra data is output on auxiliary signals 176, with the control signals 174 being passed through.

In some embodiments, an auxiliary data extractor 180 can be included in serdes 32 to receive the data signals 172, the control signals 174, and the auxiliary signals 176 from the decoding block 170. The extractor block 180 passes through the data signals 172 and outputs them as signals 182, and passes through control signals 174 as signals 184. The extractor block 180 processes any auxiliary signals 176 by combining these signals into a single output auxiliary signal 186 suitable for reception by components of the electronic device 11. For example, the signals 176 can be serialized into signal 186, where serial data can be used for extra information communicated over the bus 34, as explained above. Extractor block 180 outputs the signals 182, 184, and 186 to components of the electronic device, thus conveying the information received on the device communication bus 16.

Figure 3:
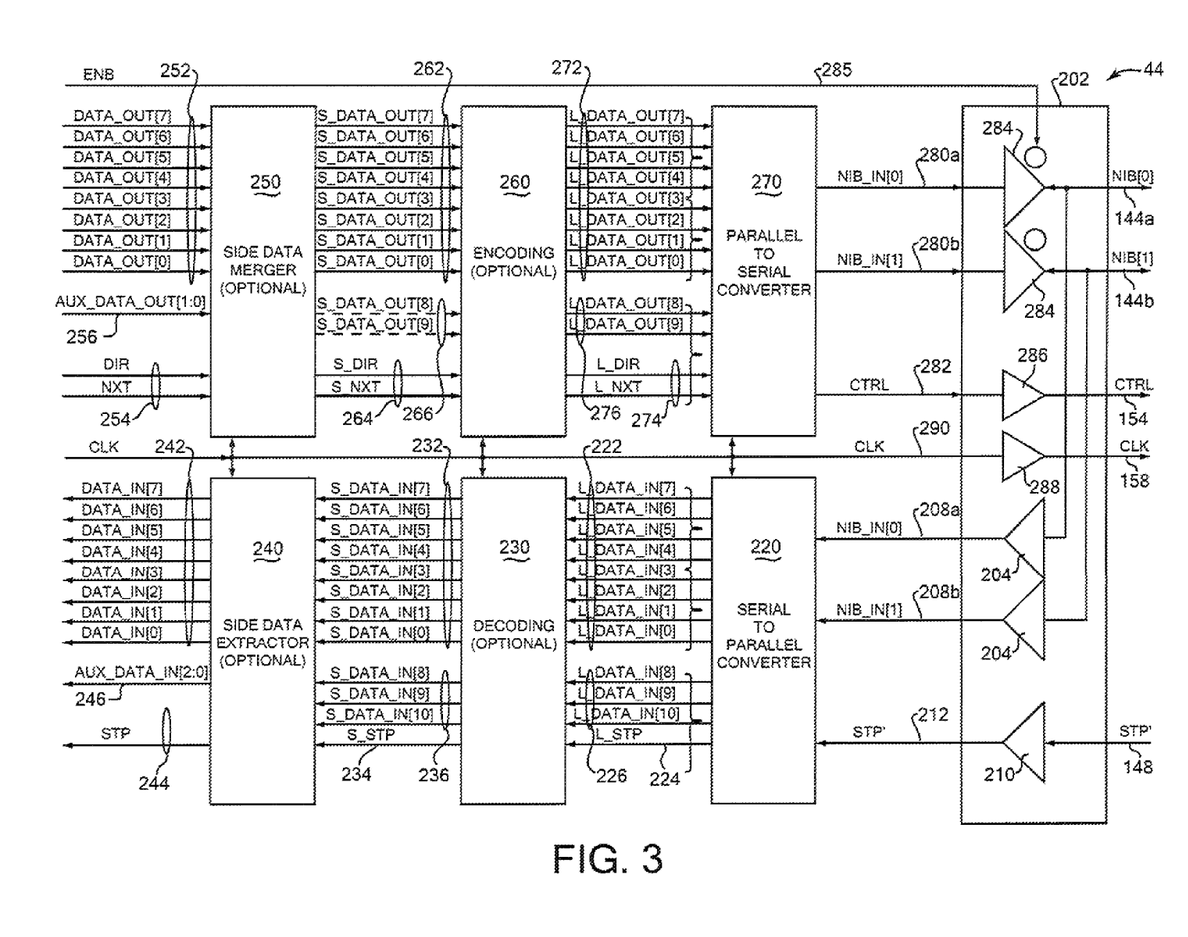
FIG. 3 is a schematic diagram illustrating one example of a serdes for use in the PHY wrapper of the PHY in FIG. 1.

FIG. 3 is a schematic diagram illustrating an example of a serdes 44 for use in the PHY wrapper 40 of the PHY 14 shown in FIG. 1. Serdes 44 can be implemented within the PHY wrapper 44 and can be connected to the other standard components of the PHY wrapper.

Serdes 44 can include an I/O block 202 for receiving the signals of the reduced-line protocol, or the I/O block 202 can be provided external to the serdes 44 within the PHY 14. The I/O block 202 includes a number of input buffers receiving the incoming signals from the link controller 20 over the interface bus 34. These buffers include input data buffers 204 which receive the data signals 144a and 144b on the bus 34 and output equivalent signals 208a and 208b. An input buffer 210 receives and buffers the incoming STP' signal 148 and outputs it as signal 212 to the serdes 44.

For receiving signals from the link controller 20 and providing the data to the PHY wrapper and communication bus 16, serdes 44 includes a serial to parallel converter block 220, a decoding block 230, and an auxiliary data extractor block 240.

The serial to parallel converter block 220 receives the signals of the reduced-line protocol from the I/O block 202, including the NIB_IN[0] and [1] signals 208a and 208b, respectively. The serial to parallel converter block 220 converts these signals into the eight data signals which the two signals 208a and 208b are carrying, and outputs these as signals 222. The converter block 220 also receives the STP' signal 212 which includes a STP signal output as signal 224, having been extracted from the STP' signal. In embodiments in which the STP' signal includes auxiliary data (such as signals CB1, CB2, and CB3 as described below with respect to FIG. 4), the converter block 220 also extracts these signals from the STP' signal 212 and outputs each of them in the group of auxiliary signals 226. The data signals 222 and control signals 224 may at this point be in the intermediate protocol if no encoding has been used.

The decoding block 230 receives the data signals 222, the control signals (e.g., STP) 224, and the auxiliary signals 226 from the serial to parallel converter 220. If encoding and decoding is being used, the decoding block 230 decodes any encoded data on the signals 222 and 226. For example, low power encoding may have been provided by the link controller 20, including encoded bits on the data signals 222 and one or more of the auxiliary signals 226. The decoded data is output by the decoding block 230 as data signals 232 and any extra data is output in auxiliary signals 236, with the control signals 234 having been passed through. Decoded data signals 232 and control signals 234 are in the format of the intermediate protocol.

In some embodiments, an auxiliary data extractor 240 can be included in serdes 44 to receive the data signals 232, the control signals 234, and the auxiliary signals 236 from the decoding block 230. The extractor block 240 passes through the data signals 232 and outputs them as signals 242, and passes through control signals 234 as signals 244. The extractor block 240 processes the auxiliary signals 236 by extracting an auxiliary data signal 246 from the intermediate protocol format of auxiliary signals 236. The single output auxiliary data signal 246 is suitable for reception by components of the PHY 14. For example, the signals 236 can be serialized into auxiliary signal 246, where the serial data can be used for extra data communicated over the bus 34, as explained for the serdes 32 of FIG. 2.

Extractor block 240 outputs the signals 242, 244, and 246 to components of the PHY wrapper 40, thus conveying the information received from the link controller 20 to standard components capable of reading the signals 182 and 184 provided in the intermediate protocol. The PHY 14 converts the signals to necessary formats to output the signals on the communication bus 16.

When receiving signals from the communication bus 16 to be provided to the SoC 12 and components of the electronic device 11, the serdes 44 receives intermediate protocol signals from other components of the PHY wrapper 40 to provide output in the reduced-line protocol over the bus 34 to the link controller 20. The serdes 44 includes an auxiliary data merger block 250, an encoding block 260, and a parallel to serial converter 270 to process these signals.

An auxiliary data merger block 250 can optionally be included in some embodiments, which receives the intermediate protocol data signals 252, control signals 254, and an auxiliary data signal 256. In the described example, there are eight data signals 252 and two control signals 254 (DIR and NXT). The auxiliary data merger block 250 passes through the data signals 252 and outputs them as data signals 262, and passes through the control signals 254 and outputs them as control signals 266. The merger block 250 also processes the auxiliary data signal 256 by merging the auxiliary data line into the intermediate protocol signal format. Specifically, the merger block 250 takes data received on the auxiliary data signal 256 and splits it into two output auxiliary lines 266 (e.g., signals CF1 and CF2 in the example of FIG. 4) suitable for serializing into the reduced-line protocol at a later stage. The data on auxiliary data signal 256 can be bits used in encoding by the encoding block 260, and/or extra data provided in addition to the data provided on data lines 100 and control signals, as explained above.

An encoding block 260 optionally can be included to receive the data signals 262, controls signals 264, and auxiliary signals 266. The encoding block 260 can perform an encoding process to encode the received information into another form suitable for particular uses. Extra data needed for the encoding can be provided on one or more of the auxiliary signals 266. For example, in some embodiments the encoding block 260 can perform low power encoding on the data of data signals 262, which provides the data in a form allowing less power consumption, e.g., transition-minimized differential signaling that converts an input of 8 bits into a 10-bit code. In one example, the encoding block 260 can use the 8 bits from the data signals 262 and two encoding bits from the auxiliary signals 266 to encode a 10-bit code providing reduced power consumption for the interface. Eight bits of the 10-bit code can be output as data signals 272, and the two other bits can be output as auxiliary data signals 276. Other types of encoding can be used in other embodiments. The control signals 264 are passed through and output as control signals 274, and any auxiliary signals not used in the encoding can be passed through encoding block 260 and output as auxiliary signals 276. In other embodiments, no encoding is performed by the encoding block 260 and/or the encoding block 260 is not included in the serdes 44.

In some embodiments, the auxiliary lines 256, 266, and 276 are used only for providing encoding bits used to encode the data by the encoding block 260. Other embodiments can use the auxiliary lines 256, 266, and 276 only to provide auxiliary data unrelated to encoding. In still other embodiments, a hybrid approach can use one or more of the auxiliary signals for encoding and other auxiliary signal(s) for extra (non-encoding) data.

A parallel to serial converter block 270 receives the data signals 272, the control signals 274, and the auxiliary signals 276. Converter block 270 converts these signals into a reduced number of signals in the reduced-line protocol (three out of five interface signals used in this example) and outputs these signals on lines of the interface bus 34. In the example of FIG. 3, eight data signals 272 are received which are converted to two NIB_OUT signals 280a and 280b, each of the output signals 280 providing the equivalent data of four of the data signals 272. For example, output signal 280a can provide the data from signals L_DATA_OUT[4]-[8] and output signal 280b can provide the data from signals L_DATA_OUT[0]-[3]. The NXY and DIR control signals 214 are provided in the CTRL output signal 282. In addition, the converter block 270 can in some embodiments combine the control signals 274 with any auxiliary signals on the two auxiliary lines 276, providing a combination of signals on the output CTRL signal 282.

The three signals 280a, 280b, and 282 output by the parallel to serial converter 270 are received by I/O block 202. I/O block 202 includes data output buffers 284 for receiving and buffering the data signals 280a and 280b and outputting them as signals 144a and 144b on the interface bus 34. Buffers 284 can be enabled or disabled by an ENB signal 285 provided by controller(s) of the PHY 14, such as one or more processors in the PHY core 46. I/O block 202 also includes an output buffer 286 for receiving and buffering the CTRL signal 282 and outputting it as signal 154 on the interface bus 34.

An output clock buffer 288 in I/O block 202 receives a CLK signal 290 from the PHY 14. In some embodiments, the clock signal CLK is generated by the PHY 14 and is provided to the components of the serdes 44, including the blocks 220, 230, and 240 on one side, and the blocks 250, 260, and 270 on the other side. The clock buffer 288 receives the CLK signal 290 and outputs it on line 158 to the SoC 12 and link controller 20 as one of the signal lines of the bus 34.

Figure 4:
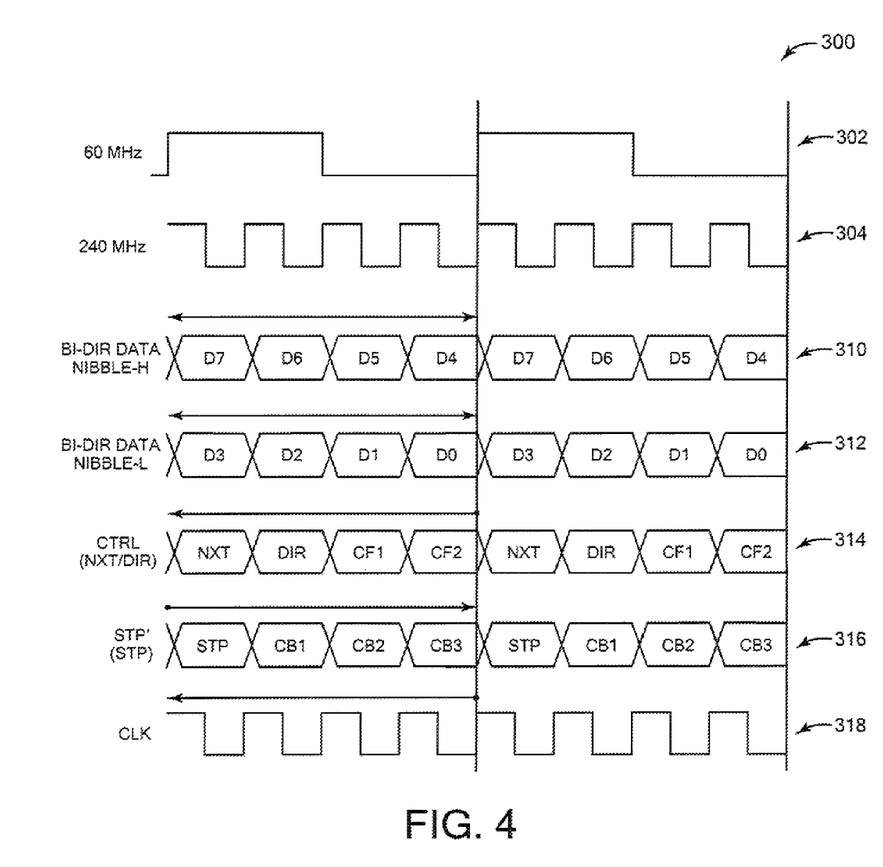
FIG. 4 is a diagrammatic illustration of an example set of signals for the reduced-line protocol between the SoC and PHY in which five signal lines are used.

FIG. 4 is a diagrammatic illustration of an example of a set of signals which can be used in some embodiments for the reduced-line protocol between SoC 12 and PHY 14 to convey information on a reduced number of lines. In this example, five signal lines are provided for the reduced-line protocol bus 34.

Timing signal 302 is a lower frequency (e.g., 60 MHz) signal shown as a reference to indicate the timing clock used for a standard implementations of a second interface protocol such as a ULPI interface. In most ULPI implementations, eight data lines and three control signal lines (NXT, DIR, and STP) are used at a data rate of 60 MHz. Timing signal 304 is a higher-frequency (e.g., 240 MHz) signal shown to indicate the data rate used for some implementations of the reduce-line protocol described herein, including the implementation of FIG. 4, to allow a reduction of the number of signal lines. For example, when using a single data rate (SDR) configuration, 240 MHz can be used. When using a double data rate (DDR) configuration, 120 MHz can be used. The data rate of four times the standard ULPI rate allows four times as much data to be transferred on a bus line in the same amount of time A first data signal 310 provides data on the interface bus 34. In the example of FIG. 4, first data signal 310 combines the data signals D4 through D7 of the second protocol. If there are eight signal lines D1-D8 in the intermediate protocol, as in ULPI implementations, then lines D4-D7 are the high nibble of these lines. First data signal 310 serializes these high nibble lines onto a single line and provides them at a frequency that is, for example, four times as great as in the intermediate protocol.

Similarly, second data signal 312 provides data on the interface bus 34. In the example of FIG. 4, second data signal 312 combines the data signals D0 through D3 of the intermediate protocol, and thus provides the low nibble of the second protocol data lines. Second data signal 310 serializes these low nibble lines onto a single line and provides them at a frequency greater than in the intermediate protocol, similarly to first data signal 310.

First control signal 314 provides multiple control signals on the interface bus 34. In the example of FIG. 4, the first control signal 314 is called CTRL and combines the ULPI control signals NXT and DIR onto a single signal. In addition, in some embodiments the first control signal 314 can include additional, auxiliary signals. In the example shown, up to two auxiliary signals CF1 and CF2 can also be serialized on the first protocol signal 314. One or more of these auxiliary signals can carry extra data similarly to the data signals D0-D7, and/or can be extra control signals. In some embodiments providing encoding as described with reference to FIGS. 2 and 3, one or more of the auxiliary signals CF1 and CF2 can be used to communicate additional data used in the encoding scheme, for example. In one example, the extra bits of the CF1 and/or CF2 signals can indicate which coding operations were used on the 8 data bits to provide minimal transitions in the signal and conserve power. Some embodiments can also provide a hybrid approach in which one of the auxiliary signals is used for encoding, and the other is used for additional data.

Second control signal 314 provides multiple control signals on the interface bus 34. In the example of FIG. 4, the second control signal 314 is called STP' and provides the ULPI control signal STP. In addition, in some embodiments the second control signal 314 can include additional, auxiliary signals. In the example shown, up to three auxiliary signals CB1, CB2, and CB3 can be serialized on the second protocol signal 314. One or more of these auxiliary signals can carry extra data similarly to the data signals D0-D7, and/or can be additional control signals. In some embodiments providing encoding as described with reference to FIGS. 2 and 3, the auxiliary signals can be used as additional bits used in the encoding scheme, for example, similarly as described above for signals CF1 and CF2. Some embodiments can also provide a hybrid approach in which one or more of the auxiliary signals are used for encoding, and the other signals are used for extra (non-encoding) data.

A clock signal 318 is also provided on one of the lines of the third protocol. As shown, the clock signal 318 is at the higher frequency/data rate of signal 304, to allow the serializing of multiple intermediate protocol signals onto a single reduced-line protocol signal.

FIGS. 5A-5D are example diagrams showing different embodiments of reduced-line protocols in which only four signal lines are used. Each of the embodiments of FIGS. 5A-5D combines the control signals and/or clock signal in a different way.

Figure 5A:
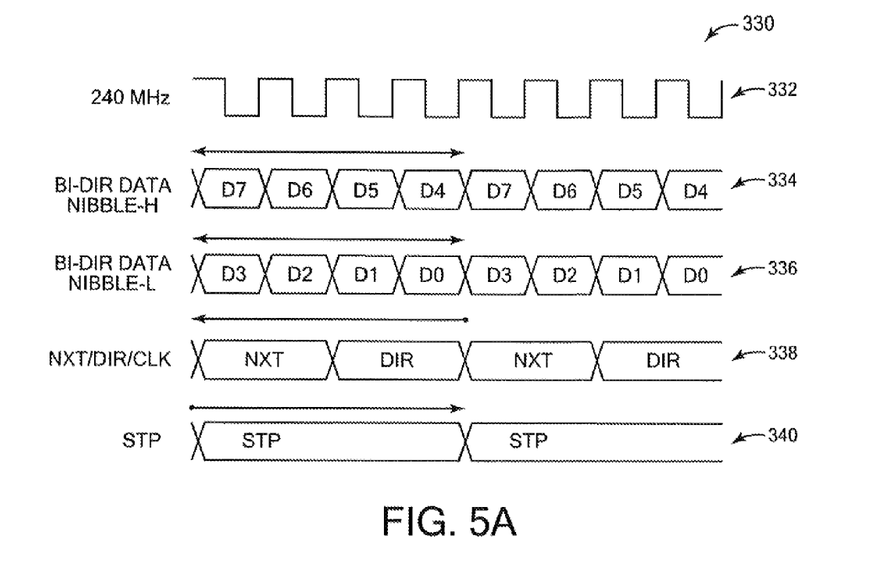
FIGS. 5A-5D are diagrammatic illustrations of different examples of reduced-line protocols in which four signal lines are used.

In FIG. 5A, one embodiment 330 of the third protocol is shown in which control signals are combined with the clock signal. In some embodiments, a 240 MHz clock can be used (SDR) as shown by signal 332. The first data signal 334 and second data signal 336 can be similar to the data signals 310 and 312 of FIG. 4, in which four intermediate protocol data signals are serialized onto each data signal 334 and 336.

In this embodiment, the first control signal 338 includes the two control signals NXT and DIR, as well as the clock signal. For example, the NXT and DIR signals can be provided in serial order on the signal, and the clock signal can be embedded in the signal 338. In one implementation, the signal 338 is encoded with a Manchester encoding scheme that allows the signal to be self-clocking and allows a clock signal to be recovered from signal 338. For example, a decoder can be provided on the SoC 12 on the link controller side of the interface bus 34 to recover the clock signal from signal 338. A second control signal 340 provides the STP control signal. In some embodiments, additional auxiliary signals can be included on the signal 338 and/or the signal 340, as described above for the embodiment of FIG. 4.

Figure 5B:
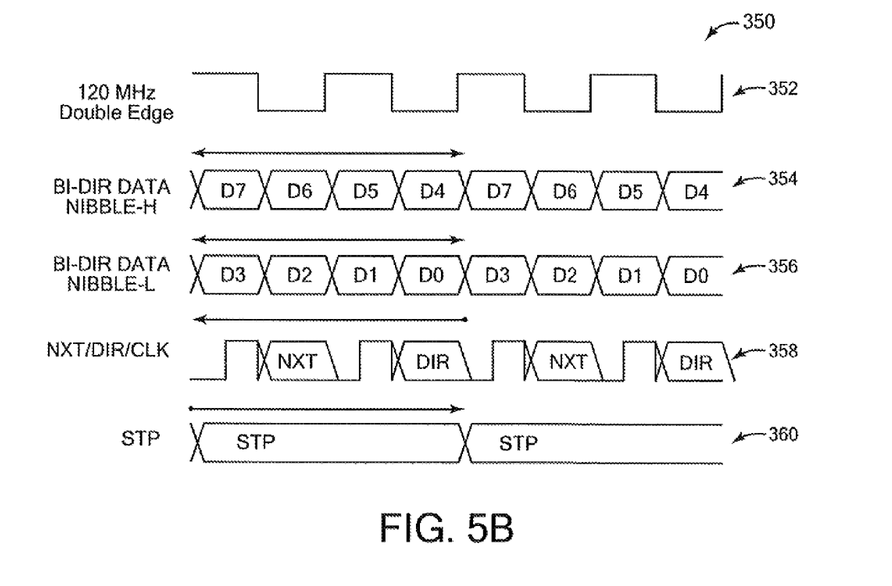

In FIG. 5B, a second embodiment 350 is shown in which control signals are combined with the clock signal. In some embodiments, a 120 MHz clock can be used (DDR) as shown by signal 352. The first data signal 354 and second data signal 356 can be similar to the data signals 310 and 312 of FIG. 4, in which four intermediate protocol data signals are serialized onto each data signal 354 and 356.

As in the embodiment of FIG. 5A, the second control signal 360 includes the STP signal and can include auxiliary data in some embodiments. Also similar to FIG. 5A, the first control signal 358 includes the two control signals NXT and DIR as well as the clock signal. However, in this example, the clock is not Manchester-encoded, but is provided as a clock signal having every other clock pulse replaced with a control signal transmitting NXT or DIR. For example, the NXT and DIR signals can alternate after every clock pulse as shown. Although the NXT and DIR signals are replacing the clock signal at these times, the clock signal is still used by the SoC as based on an internal delay line of the link controller (or other component of the SoC 12). The link controller keeps track of and uses this internal clock signal during NXT and DIR signal transmission based on the last previous clock pulse received by the SoC from the PHY 14. The internal clock line can be corrected of any deviation from the actual clock signal when an actual clock pulse is received on the signal 358.

Figure 5C:
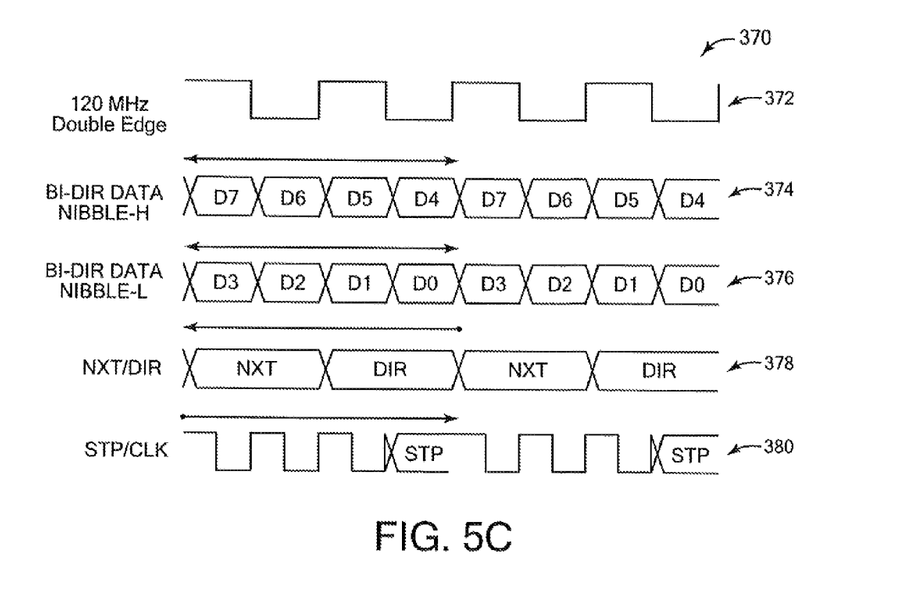

In FIG. 5C, another embodiment 370 is shown in which control signals are combined with the clock signal. In some embodiments, a 120 MHz clock can be used (DDR) as shown by signal 372. The first data signal 374 and second data signal 376 can be similar to the data signals 310 and 312 of FIG. 4, in which four data signals are serialized onto each data signal 374 and 376.

In this embodiment, the first control signal 378 includes the NXT and DIR signals similar to signal 338 of FIG. 5A, and can include auxiliary data in some embodiments. However, the clock is not included on signal 378. Instead, the STP and CLK signals are combined on control signal 380. In this embodiment, the clock signal CLK can be provided by SoC 12 to the PHY 14 instead of the PHY 14 providing the CLK signal to the SoC (this configuration is allowed by the ULPI standard, for example). The CLK signal is provided by the SoC 12 as a clock signal having every fourth clock pulse replaced with a control signal transmitting the STP signal. Although the STP signal is replacing the clock signal at these times, the clock signal is still being used by the PHY as based on an internal delay clock line of the PHY 14. The PHY 14 keeps track of and uses this internal clock signal during NXT and DIR signal transmission based on the last previous clock pulse received by the PHY 14 from the SoC. The internal clock line can be corrected of any deviation from the actual clock signal when an actual clock pulse is received on the signal 358.

Figure 5D:
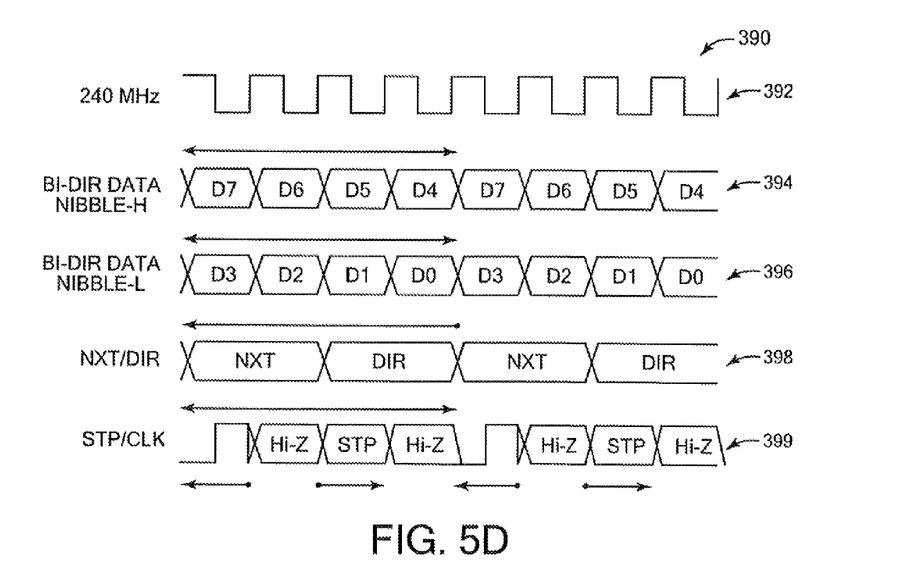

In FIG. 5D, another embodiment 390 is shown in which control signals are combined with the clock signal. In some embodiments, a 240 MHz clock can be used (SDR) as shown by signal 392. The first data signal 394 and second data signal 396 can be similar to the data signals 310 and 312 of FIG. 4, in which four intermediate protocol data signals are serialized onto each data signal 394 and 396.

In this embodiment, the first control signal 398 includes the NXT and DIR signals similar to signal 338 of FIG. 5A, and can include auxiliary data if desired. However, the clock is not included on signal 398. Instead, the STP and CLK signals are combined on control signal 399. In this embodiment, the clock signal CLK can be provided by PHY 14 to the SoC 12, and the STP signal can be provided by the SoC 12 to the PHY 14. To perform this communication in alternating directions on bus 34, a high-impedance ("Hi-Z") signal is provided after each CLK signal pulse and STP signal to allow a bus turn-around operation to be performed by the system.

In other four-line embodiments, the NXT, DIR, and STP signals can be combined into a single control signal. Since one of these signals (STP) is transmitted in an opposite direction to the other signals, the use of two additional bus turn-around signals (Hi-Z) may be needed similarly to the embodiment of FIG. 5D. This may require serializing five signals on the single line, and in some implementations may require a clock speed five times the original 60 MHz.

Figure 6:
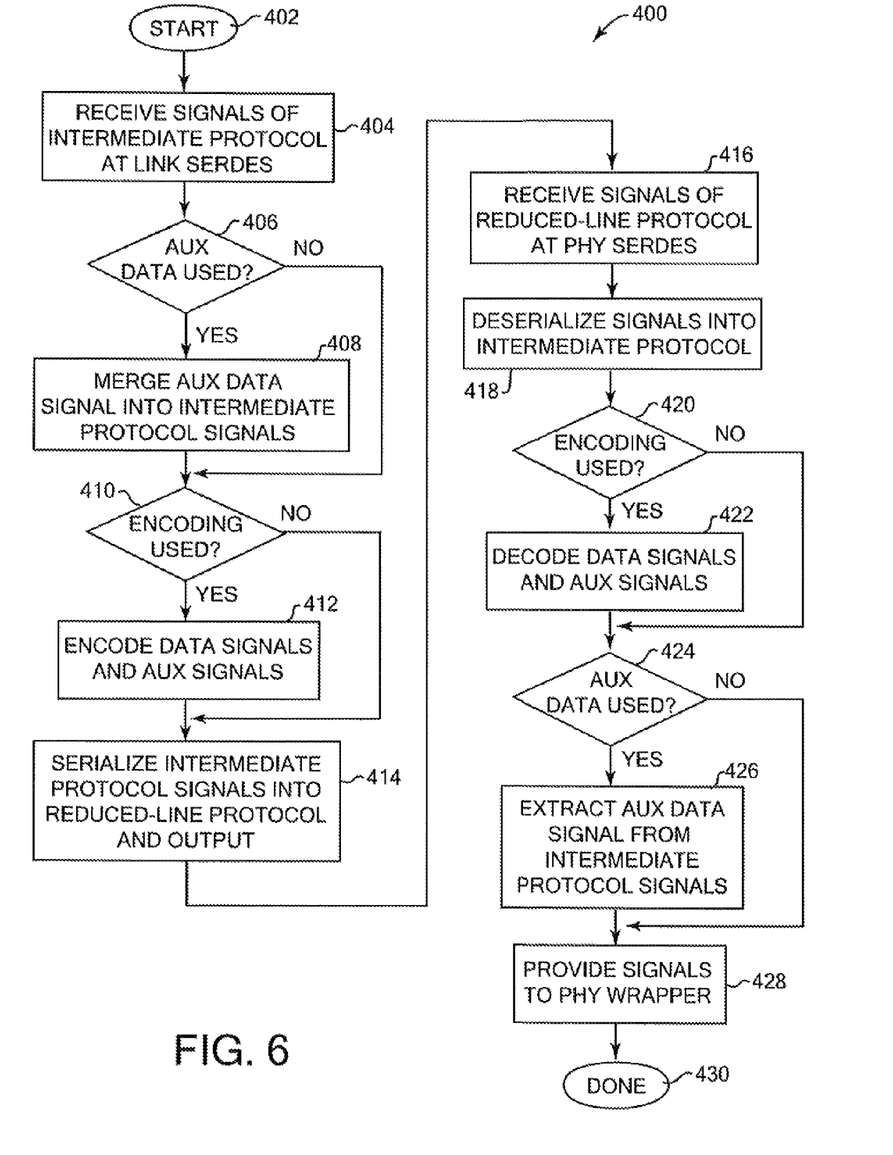
FIG. 6 is a flow diagram illustrating one example of a method for interfacing a link controller and a PHY with a reduced number of signal lines, in which data is sent from the SoC to the PHY.

FIG. 6 is a flow diagram illustrating one example of a method 400 for interfacing a link controller with a PHY with a reduced number of signal lines, in which data is sent from the SoC 12 to the PHY 14. Method 400 can be implemented, for appropriate steps, by the serdes 32 of the SoC or by the serdes 44 of the PHY. Method 400 can be implemented using software, hardware, or a combination of software and hardware elements. A software embodiment can include but is not limited to firmware, resident software, microcode, etc. Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid-state memory, magnetic tape, a removable computer diskette, a random access memory (RAM), a read-only memory (ROM), a rigid magnetic disk and an optical disk.

The method begins at 402, and in step 404, signals of the intermediate protocol are received at the link serdes 32. These signals are provided by components of the link wrapper 24 which in previous implementations would output these intermediate protocol signals on a bus to the PHY. For example, in some embodiments the intermediate protocol is ULPI. In step 406, it is checked whether auxiliary data is being used, such as for encoding and/or for extra data communication. If not, then the process continues at step 410, below. If auxiliary data is being used, then in step 408 the link serdes 32 merges the auxiliary data signal 112 (FIG. 2) into the intermediate protocol by creating auxiliary signals similar to the data signals of the intermediate protocol.

In step 410, it is checked whether encoding is being used. For example, low power encoding may be provided in some embodiments, or a different type of encoding. If not, then the process continues at step 414, below. If encoding is being used, then in step 412 the link serdes 32 encodes data signals on the data lines and one or more of the auxiliary signals according to the encoding scheme. In step 414, the link serdes 32 serializes intermediate protocol signals (and any auxiliary signals) onto reduced-line protocol signals and outputs the reduced-line protocol signals on the bus 34 to the PHY. For example, in some embodiments described above, the reduced-line protocol signals can include two data signals and a number of control signals, such as STP' as shown in FIG. 2.

In step 416, the PHY serdes 44 receives the reduced-line protocol signals sent by the SoC serdes 32 on the bus 34. In step 418, the PHY serdes 44 deserializes the signals into intermediate protocol signals, such as ULPI signals, and any auxiliary signals. In step 420, it is checked whether encoding is being used. If not, then the process continues at step 424, below. If encoding is used, then in step 422 the PHY serdes 44 decodes data signals on the data lines and one or more of the auxiliary signals according to the encoding/decoding scheme.

In step 424, it is checked whether auxiliary data is being used (e.g., for non-encoding purposes, such as for communication of extra data). If not, then the process continues at step 428 below. If auxiliary data is being used, then in step 426 the PHY serdes 44 extracts the auxiliary data signal 112 (FIG. 3) from the intermediate protocol signals by creating a combined (e.g. serialized) auxiliary data signal as a separate communication channel. In step 428, the PHY serdes 44 provides the resulting intermediate protocol signals and auxiliary data signal (if used) to the PHY wrapper 40 for normal processing. For example, the PHY wrapper can process ULPI signals into UTMI or UTMI+ signals for use by the PHY core, which translates the signals into a form appropriate for output on the communication interface 16. The process is complete at 430.

When communicating signals in the opposite signal direction, i.e., such that data is sent from the PHY 14 to the SoC 12, a similar process to method 400 can be used. When using the example signals described in FIGS. 2-4, the main difference of this data direction compared to the method 400 is that the PHY serdes 44 outputs a different set of reduced-line protocol signals on the bus 34 to the SoC 12. For example, the PHY 14 can output two data signals, a CTRL signal (including NXT and DIR control signals), and a CLK signal. In addition, more auxiliary signals may be able to be sent in one direction than the other if less control signals are provided in one of the directions. For example, three auxiliary signals can be received and processed by the PHY serdes 44 while two auxiliary signals can be received and processed by the link serdes 32 in the examples described above.

It should be noted that the order of steps described in FIG. 6 is only one example, and that different orders can be used in other embodiments, and/or some steps performed simultaneously.

The embodiments described herein allow the use of a reduced-line interface in a system communicating using a common interface standard, such as USB. Although the embodiments described herein are with reference to the USB interface, other interface standards can be used in other embodiments in accordance with features described herein.

The reduced-line protocol interface described above can significantly reduce the number of lines needed for communication between an SoC and a PHY in a communication interface, thus allowing a reduced number of I/O pins on integrated circuits and consequently less expense in manufacturing components and more options in component placement.

The protocol described herein lets the rest of the link controller and PHY systems outside the serdes 32 and 44 to consider the communication as if it were the standard intermediate protocol at the standard frequency or data rate, thus preserving the standard and reducing the amount of software and hardware changes needed to implement the systems described herein. For example, in ULPI systems, the interface described herein allows SoC integrators to reduce the number of pins while able to re-use the entire ULPI ecosystem, including the USB software stack, UTMI components, ULPI_BRIDGE, ULPI partitioning, and CMOS I/Os. The reduced-line interface can have no impact or changes from standardized software approaches and small added cost to hardware.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A physical layer circuit for interfacing a link controller and a device communication bus, the physical layer circuit comprising:
   a wrapper coupled to a first interface bus having five communication lines and coupled to a second interface bus having a larger number of communication lines than the first interface bus, wherein the wrapper is operative to communicate first signals with the link controller over the first interface bus and to perform conversion between the first signals and second signals communicated on the second interface bus; and
   a core coupled to the wrapper by the second interface bus, the core operative to communicate device signals with the device communication bus coupled to the core by performing conversion between the second signals and the device signals;
   wherein two lines of the first interface bus are used to provide data, two lines of the first interface bus are used to provide control signals, and one line of the first interface bus is used to provide a clock signal.

2. The physical layer circuit as recited in claim 1 wherein the wrapper includes a serdes to convert between the first signals and intermediate signals of an intermediate protocol having a greater number of lines than the first interface bus, wherein the intermediate signals are converted by the wrapper to a second protocol for the second interface bus.

3. The physical layer circuit as recited in claim 2 wherein the serdes is a first serdes, and wherein the link controller includes a second serdes compatible with the first serdes and operative to convert between the first signals and intermediate signals of the intermediate protocol having a greater number of lines than the first interface bus.

4. The physical layer circuit as recited in claim 3 wherein the second interface bus follows the UTMI or UTMI+ protocol (USB Transceiver Macrocell Interface) protocol, and wherein the intermediate protocol is ULPI (UTMI+ Low Pin Interface).

5. The physical layer circuit as recited in claim 2 wherein at least one of the lines of the first interface bus includes at least one auxiliary signal.

6. The physical layer circuit as recited in claim 5 wherein the auxiliary signal carries data used to encode data on data lines of the intermediate protocol.

7. The physical layer circuit as recited in claim 5 wherein the auxiliary signal carries extra data in excess of data carried by the intermediate protocol.

8. The physical layer circuit as recited in claim 1 wherein the physical layer circuit is on a physical layer chip, and wherein the link controller is provided on a system on a chip (SoC) external to the physical layer chip.

9. The physical layer circuit as recited in claim 1 wherein the device communication bus is Universal Serial Bus (USB).

10. A physical layer circuit for interfacing a link controller and a device communication bus, the physical layer circuit comprising:
    a wrapper coupled to a first interface bus having four communication lines and coupled to a second interface bus having a larger number of communication lines than the first interface bus, wherein the wrapper is operative to communicate first signals with the link controller over the first interface bus and to perform conversion between the first signals and second signals communicated on the second interface bus; and
    a core coupled to the wrapper by the second interface bus, the core operative to communicate device signals with the device communication bus coupled to the core by performing conversion between the second signals and the device signals;
    wherein two lines of the first interface bus are used to provide data, and two lines of the first interface bus are used to provide control signals and a clock signal combined with one of the control signals.

11. The physical layer circuit as recited in claim 10 wherein the wrapper includes a serdes to convert between the first signals and intermediate signals of an intermediate protocol having a greater number of lines than the first interface bus, wherein the intermediate signals are converted by the wrapper to a second protocol for the second interface bus.

12. The physical layer circuit as recited in claim 11 wherein the serdes is a first serdes, and wherein the link controller includes a second serdes compatible with the first serdes and operative to convert between the first signals and intermediate signals of the intermediate protocol having a greater number of lines than the first interface bus.

13. The physical layer circuit as recited in claim 12 wherein the second interface bus follows the UTMI or UTMI+ protocol (USB Transceiver Macrocell Interface) protocol, and wherein the intermediate protocol is ULPI (UTMI+ Low Pin Interface).

14. The physical layer circuit as recited in claim 10 wherein the physical layer circuit is on a physical layer chip, and wherein the link controller is provided on a system on a chip (SoC) external to the physical layer chip.

15. The physical layer circuit as recited in claim 11 wherein at least one of the lines of the first interface bus includes at least one auxiliary signal.

16. The physical layer circuit as recited in claim 15 wherein the auxiliary signal carries data used to encode data on data lines of the intermediate protocol.

17. The physical layer circuit as recited in claim 15 wherein the auxiliary signal carries extra data in excess of data carried by the intermediate protocol.

18. The physical layer circuit as recited in claim 10 wherein the device communication bus is Universal Serial Bus (USB).

* * * * *